May 6, 1969 R. A. SPENCER 3,443,059
HAND TOOL FOR APPLYING HOT MELT ADHESIVES AND THE LIKE
Filed Oct. 11, 1965
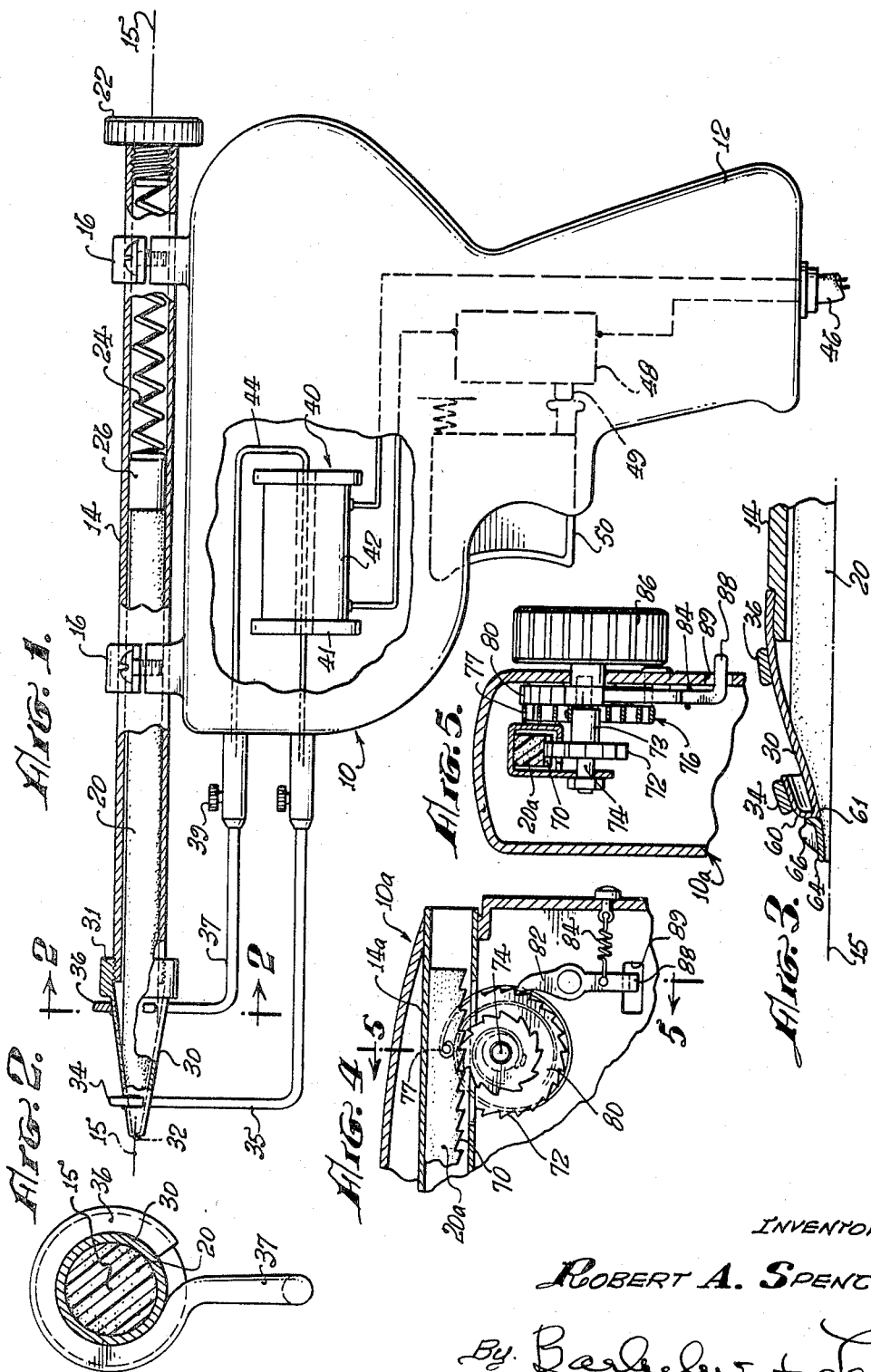
INVENTOR
ROBERT A. SPENCER,
By Batchelor & Lewis

United States Patent Office 3,443,059
Patented May 6, 1969

3,443,059
HAND TOOL FOR APPLYING HOT MELT ADHESIVES AND THE LIKE
Robert A. Spencer, Monterey, Calif., assignor to Lockwood Technical, Inc., Sand City, Calif., a corporation of California
Filed Oct. 11, 1965, Ser. No. 494,578
Int. Cl. H05b 1/00, 3/42
U.S. Cl. 219—233                                             5 Claims

ABSTRACT OF THE DISCLOSURE

A tool for applying hot melt adhesive and the like to a work surface includes means for continuously urging a column of solid adhesive longitudinally forward toward an oblique wall that is differentially heated. Melted adhesive is dispensed through an aperture at the forward portion of the wall. The wall area in the path of peripheral portions of the column is heated only enough to soften the adhesive without melting it, thus preventing escape of molten adhesive backward along the sides of the column. Such differential heating of the oblique wall permits control of both initiation and termination of adhesive supply entirely through turning the heater on and off.

A preferred heating mechanism utilizes a conical wall with aperture at its apex. An electrical heating current is passed directly through the wall between annular electrodes adjacent the aperture and adjacent the base of the cone. With that arrangement, the required differential heating can be obtained from the varying current density along the length of the cone.

Termination of adhesive supply is accelerated by cooling fins on the exterior of the dispensing nozzle and by specific electrode structure. The column of adhesive is preferably advanced by a toothed drive wheel engaging rack formations of the column, with a tensioned helical spring urging rotation of the wheel.

---

This invention has to do with a hand tool for intermittently and accurately applying to a work surface a heated fluid material, such as hot melt adhesive, for example.

A wide variety of thermosetting plastics are now well known and commonly available in solid form, and are potentially useful as adhesives and for other purposes. However, such materials are inconvenient to use because of the difficulty of melting them prior to application to a work surface. For large scale operations machines have been developed which largely eliminate such difficulties, particularly if the rate of consumption of hot melt material is reasonably uniform and continuous.

However, there is need for a simple and economical hand tool that is entirely reliable in use and that permits convenient application of hot melt to a work surface in quantities ranging from very small to reasonably large.

The present invention provides a hand tool of the described type with the further advantage that the required warm-up time is extremely short, permitting convenient application of hot melt promptly whenever it may be required.

The invention provides a hot melt applicator in which warm-up time may be reduced to a matter of seconds. That is accomplished in part by supplying electric heat in adequate quantity, but primarily by supplying that heat precisely and solely to the very limited area where it is needed. By that accurate control of the heat distribution, the device not only becomes operative very rapidly after being turned on, but cools off rapidly after being turned off. Accurate and convenient selective control of the flow of hot melt material can therefore be obtained by the single control operation of turning the electrical heating current on and off.

Accordingly, the invention in its preferred form permits metered dispensing of hot melt without requiring any valve mechanisms whatever. The primary source of maintenance problems in previously available devices is thereby completely eliminated, and the operator is relieved of the need for operating a valve as well as a heat control.

A further advantage of the present invention in its preferred form is the provision for automatic and continuous feed of solid material to the melting zone. The operator is thereby freed from intermittently operating a mechanical feeding device for control of the supply of hot melt.

A further aspect of the invention provides convenient means for adjustably varying the force with which the solid adhesive column is continuously and yieldably urged forward toward the melting zone.

A full understanding of the invention, and of its further objects and advantages, will be had from the following description of certain illustrative manners in which it may be carried out. The particulars of that description, and of the accompanying drawings which form a part of it, are intended only as illustration and not as a limitation upon the scope of the invention, which is defined in the appended claims.

In the drawings:
FIG. 1 is a side elevation, partially cut away, representing an illustrative embodiment of the invention;
FIG. 2 is a section at enlarged scale on the line 2—2 of FIG. 1;
FIG. 3 is a fragmentary detail illustrating a modification;
FIG. 4 is a fragmentary section in the same aspect as FIG. 1 and showing a modification; and
FIG. 5 is a section on line 5—5 of FIG. 4.

The illustrative embodiment of the invention shown in side elevation in FIG. 1 comprises a main support and housing 10. A convenient handle is provided in the form of a conventional pistol grip 12 by which the device can be manipulated with one hand. A tubular guideway 14 with axis 15 is carried by housing 10, typically in the general position relative to grip 12 that would be occupied by the barrel of a pistol. Guide tube 14 may be incorporated if desired within the body of housing 10, as in FIGS. 4 and 5, but is shown in FIG. 1 mounted above the housing by means of the clamp brackets 16. Guide tube 14 is typically a cylindrical tube of stainless steel or similar material, adapted to freely receive and guide a column of solid adhesive or other easily meltable material to be dispensed. Such material is preferably in the form of a stick or cartridge 20 of uniform section and of a size to slide freely in the guideway.

The rearward end of guide tube 14 is closed by a screw cap 22, which may be removed to insert a cartridge of adhesive. A coil spring 24 and follower or plunger 26 are inserted in tube 14 between the cartridge and cap, and may be permanently mounted on the cap for removal with it. Spring 24 maintains follower 26 continuously in contact with the rear face of cartridge 20 with a yielding force that urges the cartridge forwardly along guideway 14, that is, toward the left as seen in FIG. 1. The spring is designed to exert essentially uniform force throughout the travel of the follower.

Forward movement of the cartridge along tube 14 is limited by the wall or closure 30, which extends obliquely across the tube in blocking relation to cartridge 20. Wall 30 is formed, at least primarily, of sheet material of low heat capacity and of limited electrical conductivity. It is preferably detachably mounted on tube 14 by the threaded flange 31. Means are provided, as will be more fully described, for intermittently heating wall 30 over at least a major portion of the cross section of cartridge 20. Since the forward end face of the cartridge continuously abuts wall 30, in response to the yielding force of spring 24, such heating of the wall melts the cartridge locally at its forward face. As the melted material is removed, the cartridge is enabled to move forwardly in response to the continuous spring pressure, bringing fresh solid material effectively into contact with wall 30 to be melted in turn.

A delivery nozzle for delivery of the hot melt to a work surface is provided close to the face of wall 30 at which local melting occurs. In preferred form of the invention a passageway is maintained continuously open for free flow of hot melt from the rear face of wall 30 to and through the delivery nozzle.

That straightforward delivery structure is facilitated by constructing wall 30 in the form of a cone coaxial with guide tube 14 and with its apex directed forwardly. The conical wall is apertured at 32 at the cone apex on axis 15, as by slightly truncating the cone. That simple aperture constitutes both delivery nozzle and connecting passage between the nozzle and the rearward or working face of wall 30. If desired, the nozzle may be lengthened somewhat by flaring out the cone apex or by adding a short tube section. The delivery end of the nozzle may be of circular section, or may be flattened or otherwise modified as desired.

Wall 30 is heated by passing an intense electric current directly through the sheet material of which it is composed. For that purpose two electrodes of high current carrying capacity are electrically connected to the wall sheet at mutually spaced areas, as by welding or silver soldering, for example. In the present embodiment the electrode structures 34 and 36 are of ring form and contact substantially annular regions of conical wall 30 adjacent the apex and the base of the cone, respectively. Current is supplied to the electrodes via conductors 35 and 37 of high current carrying capacity, and the ring electrodes, typically of copper, are designed to have sufficiently low electrical resistance to insure effectively uniform distribution of the current circumferentially of the conical wall.

Electrical power is supplied to conductors 35 and 37 at low voltage, typically less than one volt, and at the correspondingly high amperage. Such power may be obtained conveniently from conventional 115-volt alternating current power by means of a step-down transformer of the general type that is employed in the portable soldering tools known commercially as "soldering guns." Such a transformer is indicated schematically in FIG. 1 at 40, with an iron core 41, a primary winding 42 of several hundred turns, and a secondary winding 44 typically having only a single turn, giving a step-down ratio of the order of several hundred to one. The most favorable value for that ratio depends upon such factors as the detailed form of wall 30 and the material of which it is made, which may be brass or stainless steel, for example. Power at 115 volts is supplied to primary 42 via the conventional flexible cord 46 and the on-off switch indicated schematically at 48 with operating button 49. That button is depressed to close the switch by pulling the trigger-type lever 50. On release of trigger 50, the switch is opened by a spring which may be incorporated within the switch housing.

When transformer 40 is energized, current passes through the relatively thin wall 30 between the annular regions of contact of electrodes 34 and 36. With axial symmetry of the parts, as illustratively shown, the lines of current flow in wall 30 lie in planes through axis 15. Assuming uniform wall thickness, the effective cross-section of the metal available for conducting that current increases linearly from apex electrode 34 toward base electrode 36 in direct proportion to the radius and hence the circumference of the cone. The effective resistance is therefore highest close to the apex electrode, that is, adjacent nozzle aperture 32, and decreases rearwardly and radially outwardly from axis 15. That variation in resistance causes the heat production to be more intense near the nozzle and to decrease toward the periphery of the cone. From a slightly different viewpoint, the increased heat intensity near the nozzle may be considered to result from the greater current density per unit cross section of the wall.

Such heat distribution is highly favorable for two primary reasons. First, when the circuit is first closed, the greater heat production per unit of wall surface near the nozzle tends to heat that portion of the wall to the melting temperature of the adhesive while the peripheral portion is still relatively cool. The small nozzle is heated quite rapidly by conduction, melting the solid adhesive that typically fills the nozzle from previous use of the device. The nozzle is thereby readied for service before appreciable melting occurs near the periphery of the cartridge.

Second, during continued dispensing of adhesive, forward movement of the cartridge is determined primarily by the rate of heating of its peripheral region, which is relatively slow. Hence that region tends to be first softened and deflected radially inward by camming action of conical wall 30. The adhesive becomes fully melted only as it approaches the hotter wall area nearer axis 15. The adhesive thus has an opportunity to conform closely to wall 30 as it softens, effectively sealing the region adjacent the nozzle against back-flow of fluid material. Hence, despite the free fit of the main body of cartridge 20 within guide tube 14, the force of spring 24 acts effectively on a sealed piston to pressurize the molten adhesive at the nozzle.

The progressive heating of the adhesive as it flows forward and radially inward along the heated conical wall 30 has the further advantage of bringing it to maximum temperature only as it reaches the nozzle for delivery. The device may therefore be designed, if desired, to deliver adhesive at higher than normal working temperature without risk of appreciable deterioration of the material due to temperature decomposition.

To terminate delivery of hot melt, it is only necessary to release trigger 50, cutting off the heating current. The entire wall 30 and the hot melt immediately back of it then rapidly cool, causing the melt to solidify in position. Due to the relatively small volume of material close to nozzle aperture 32, the rate of cooling is typically much greater in that region, causing solidification of the melt to start at the nozzle itself despite the relatively high initial temperature at that point. With a little practice an operator has no difficulty in obtaining accurate metering of any desired quantity.

For maximum speed of response, it is desirable that the relatively heavy copper electrodes 34 and 36 be arranged so that operation of the device is not dependent upon heating and cooling the electrodes themselves. That is accomplished in FIG. 1 for outer electrode 36 by extending conical wall 30 to a radius from axis 15 that is appreciably greater than the radius of the adhesive cartridge. The region of contact of electrode 36 is thereby limited to an annular wall area that is spaced outwardly from the cartridge by a sufficient distance that any tendency of the electrode to act as a heat sink will not significantly affect the temperature of the working portion of the wall. Such effective thermal isolation of the electrode from the working portion of the transverse wall is greatly aided by the fact that the materials most suitable for fabricating the wall, that is, materials with limited electrical conductivity, have also a relatively low heat conductivity. Hence the equilibrium wall temperature becomes essentially independent of a heat sink only a short distance from it.

The same type of thermal isolation of wall 30 from inner electrode 34 is obtainable by making the electrode radius larger than that of the conical wall at the region of effective contact and providing a generally annular connection of low thermal conductivity. That connection is preferably thin in section and made of material having limited thermal conductivity. Such a connective member of thin annular form is represented in FIG. 3 at 60, electrically contacting the main body of wall 30 at 61. The outer periphery of ring 60 is connected to electrode 34, typically by welding or silver soldering. Its inner periphery may be similarly connected to the outer surface of wall 30, but is shown integral with that wall. With that construction the region 61 of electrical connection to the wall 30 can be closely adjacent the delivery end of nozzle. The nozzle itself, or the entire section between contact region 61 and the nozzle, may comprise an element 64 of material having properties that differ in any desired respects from those of wall 30. For example, nozzle element 64 may be of copper or other material having relatively high heat conductivity. Its temperature will then follow more closely that of the wall region immediately to the rear of connection region 61. And such a nozzle section may be mounted, as indicated in FIG. 3, primarily on the connective portion 60. The nozzle then derives heat from current flow in ring 60 as well as from current flow in the adjacent conical portion of the wall. Adequate heat for the nozzle may thus be obtained while retaining a desired elevated temperature of material entering the nozzle.

More rapid termination of hot melt delivery following release of trigger 50 may be obtained, if desired, by providing increased cooling for the nozzle region of the device. That may be done, for example, by mounting cooling fins on the outer periphery of the nozzle, as indicated somewhat schematically at 66 in FIG. 3. Such fins are preferably so placed as to be well clear of the work surface to which adhesive is to be applied, to avoid picking up adhesive on the fins with consequent reduction of their effectiveness. When such cooling means are provided to accelerate cooling after deletion of power, the rate of heat supply during operation must, of course, be adequate to overcome the added heat loss.

The exact nature of the variation of heat production in wall 30 as a function, for example, of distance from axis 15, may be varied within wide limits by suitable design of the wall configuration. FIG. 3 shows an illustrative wall form with a slight general S-curve as seen in section. The term "generally conical" as employed in the present specification and claims is intended to include such forms in which the generating line element is not straight. Further control of the heat distribution is obtainable by variation of the wall thickness. Such variation may have axial symmetry. Alternatively, for example, the wall may be made thicker above or below axis 15 to adjust the rate of heat input for compensating such effects as gravity or differences in radiative cooling of the wall. Also, the apex of wall 30 need not lie on axis 15 of the guide tube. In particular, the axis of the cone may be inclined downwardly in a forward direction relatively to axis 15, thereby facilitating outward flow of the molten adhesive in response to gravity. However, in preferred form of the invention, an appreciable fluid pressure is developed in the molten adhesive by the thrust of spring 24 or its equivalent, as already described, tending to make the flow pattern only slightly dependent upon gravity.

The cartridges 20 of solid material may have any desired sectional form, though a circular section tends to produce most uniform melting. It is generally desirable that the guideway for the cartridge conform approximately to the cartridge section, at least close to the forward end wall. Further to the rear, the illustrated tubular guide may be replaced, if desired, by rails or other guide members of any kind suitable for maintaining alinement of the cartridges as they move into contact with the heated transverse element at 30. The fully closed tubular guide of FIGS. 1 and 2 has the advantage that solid adhesive or other meltable material may be introduced in a wide variety of forms, including powdered or granular.

The entire guide tube may be removed by release of clamps 16 and replaced by one of a different type or size, either with or without replacement of the heating assembly comprising wall 30 and its associated electrodes and nozzle formation. For that purpose it is convenient to provide a releasable connector at some point in the electrical connections 35 and 37, as illustrated somewhat schematically by the releasable thumb screws 39 in FIG. 1.

FIGS. 4 and 5 illustrate somewhat schematically a modified structure in which the guideway 14a for the solid adhesive has its rearward portion enclosed within the housing 10a, but with its rear end open for insertion of new cartridges. This modified form of the invention also illustrates alternative mechanism for continuously advancing the cartridge of solid adhesive. Cartridge 20a is of rectangular section, and is formed with rack-like teeth 70 along one face. A drive sprocket 72 with hub 73 is rotatably mounted on the shaft 74 and carries peripheral teeth adapted to engage cartridge teeth 70 and translate sprocket rotation into forward translational movement of the cartridge. The sprocket is driven by a helical spring 76, one end of which is connected to the sprocket hub. The other end of spring 76 is connected by the pin 77 to a spring winding assembly which comprises the handle 86 and the ratchet gear 80 and which is rotatably mounted on shaft 74. The teeth of gear 80 are engaged by the pawl 82 to permit gear rotation normally only in the spring winding direction. Pawl 82 is urged toward gear engagement by the spring 84. A spring releasing lever 88 is preferably coupled to pawl 82 and is accessible to the operator through the slot 89 in the housing. By manually swinging the pawl against the force of its spring 84 out of engagement with ratchet gear 80, the operator may thus unwind spring 80 partially or completely as desired.

The cartridge advancing mechanism of FIGS. 4 and 5 has the advantage that the yielding force urging cartridge 20a forward can be varied at will by the operator by winding spring 80 tighter or by partially releasing it with the help of lever 88 and handle 86. The spring force can thus be made to conform to the type of work at hand. Once the desired spring force has been obtained, the relatively soft helical spring tends to maintain that force effectively constant as it unwinds, requiring additional winding only occasionally.

For application of adhesive and the like to certain types of work it is desirable that the dispensing nozzle be of flat section so that the fluid is extruded in the form of a ribbon. In FIG. 3, for example, the aperture of nozzle 64 may be considered to be elongated in a direction perpendicular to the plane of the paper. The generally conical wall 30 then typically forms a gradual transition from that elongated, slit-like form to the round or rectangular section of the main body of the guide tube 14. Particularly if the guide tube is of rectangular section, for example as shown in FIG. 5, the end wall 30 of FIG. 1 or 3 may also be of rectangular section throughout the transition to a slit-like nozzle, the upper and lower wall sections being distinctly oblique to the tube axis, as shown in FIG. 3, and the side wall sections being generally parallel to that axis. With such structure the appearance of such a section as FIG. 3 is typically essentially unchanged as the plane of the section is shifted along the elongated nozzle while remaining parallel to axis 15. It is then usually sufficient for the electrodes to contact only the oblique sections of the end wall, allowing the essentially parallel sections to be heated by stray currents and by conduction from the directly heated oblique sections.

I claim:

1. In a hand tool that is intermittently and controllably actuatable to apply melted thermoplastic adhesive to selected mutually spaced areas of a work surface and that comprises the combination of a tubular chamber for containing solid thermoplastic adhesive and terminating at its forward end in a transverse end wall containing a delivery orifice, biasing means for urging adhesive in the chamber toward the orifice, means for applying heat to a forward portion of the chamber to melt adhesive, handle means for manipulating the tool to position the orifice with respect to a work surface, and control means selectively actuatable to cause intermittent extrusion of melted adhesive from the orifice; the improvement characterized in that said end wall consists essentially of a metal sheet of generally conical, forwardly tapering form with the delivery orifice located at the cone apex and continuously open for adhesive delivery therethrough, the sheet having low heat capacity and limited electrical conductivity and having its inner face directly exposed to adhesive in the chamber and its outer face directly exposed to the surrounding atmosphere, said heat applying means comprise inner and outer electrode formations electrically contacting the sheet at mutually spaced generally annular regions adjacent the orifice and the cone periphery, respectively, and circuit means interconnecting the electrode formations and energizable to pass an electric current of selected magnitude through the sheet between the electrodes to heat the sheet differentially, the current magnitude being selected to promptly melt adhesive adjacent the delivery orifice at the cone apex while only softening adhesive adjacent the cone periphery, said biasing means comprise structure for engaging solid adhesive in the chamber and for exerting continuously on the adhesive a yielding forwardly directed force that is sufficient, in presence of the electric current, to extrude from the orifice onto the work surface said adhesive melted by the electric current and to cam inward toward the orifice said adhesive only softened by the current, and said control means comprise a switch connected in the circuit and manually actuatable to intermittently energize the circuit means, switch closure causing prompt delivery of melted adhesive from the orifice onto an adjacent area of a work surface, and switch opening causing prompt hardening of the melted adhesive at the orifice by heat transfer through the sheet and thereby terminating said delivery independently of said yielding force to permit relative manual shifting of the tool to another area of the work surface.

2. The improvement defined in claim 1, and including heat conducting fin structure mounted on the outer face of said sheet adjacent the cone apex for accelerating heat conduction from the sheet to the surrounding atmosphere.

3. A hand tool for applying hot melt adhesive and the like to a work surface, comprising in combination structure forming a guideway adapted to guide a column of solid meltable adhesive and the like for longitudinal translational movement, means for continuously urging column movement in a forward direction, the guideway terminating at its forward end in a transverse end wall centrally apertured and formed essentially of sheet material of limited electrical conductivity, inner and outer electrode means electrically contacting said end wall at mutually spaced generally annular regions that substantially enclose the aperture and are respectively adjacent the aperture and the outer periphery of the end wall, means including selectively actuatable switch means for intermittently passing an electric current of high amperage through the end wall between said electrode means to heat differentially essentially the entire end wall in the path of the column, said current being selected to produce melting of the forward end face of the column adjacent the wall aperture while only softening said end face adjacent the column periphery, and a feed nozzle communicating with said aperture for intermittently delivering molten adhesive and the like to a work surface in response to intermittent actuation of the switch means, said nozzle including heat conductive fin structure for accelerating the cooling of the nozzle following switch means deactuation to arrest delivery of adhesive and the like.

4. A hand tool for applying hot melt adhesive and the like to a work surface, comprising in combination structure forming a guideway adapted to guide a column of solid meltable adhesive and the like for longitudinal translational movement, resilient means for continuously urging column movement in a forward direction and comprising peripherally toothed wheel means adapted to engage mating formations on a side wall of the column of solid adhesive and the like, helical spring means tensionable to urge wheel rotation in a direction to advance the column forwardly along the guideway, and means for tensioning the spring a selected amount, the guideway terminating at its forward end in a transverse end wall centrally apertured and formed essentially of sheet material of limited electrical conductivity, inner and outer electrode means electrically contacting said end wall at mutually spaced generally annular regions that substantially enclose the aperture and are respectively adjacent the aperture and the outer periphery of the end wall, means including selectively actuatable switch means for intermittently passing an electric current of high amperage through the end wall between said electrode means to heat differentially essentially the entire end wall in the path of the column, said current being selected to produce melting of the forward end face of the column adjacent the wall aperture while only softening said end face adjacent the column periphery, and a feed nozzle communicating with said aperture for intermittently delivering molten adhesive and the like to a work surface in response to intermittent actuation of the switch means.

5. A hand tool for applying hot melt adhesive and the like to a work surface, comprising in combination structure forming a guideway adapted to guide an elongated cartridge of solid meltable adhesive and the like for longitudinal translational movement, wheel means rotatable mounted adjacent the guideway and peripherally toothed for engaging mating formations on a side wall of a cartridge in the guideway, manually tensionable helical spring means for continuously urging wheel rotation in a direction to advance the cartridge forwardly along the guideway, means for manually tensioning the spring a selected amount, means for intermittently heating the wall to locally melt the forward end portion of an advancing cartridge, and nozzle means for delivering melted cartridge material from the rear surface of the wall to a work surface.

References Cited
UNITED STATES PATENTS

| | | | |
|---|---|---|---|
| 2,117,179 | 5/1938 | Kopp | 18—12 |
| 2,255,578 | 9/1941 | Baker | 13—6 |
| 3,109,045 | 10/1963 | Silverman | 13—6 |
| 1,237,862 | 8/1917 | Bintliff. | |
| 1,449,517 | 3/1923 | Lame | 120—116 |
| 2,773,496 | 12/1956 | Czarnecki | 126—343.5 |
| 2,871,333 | 1/1959 | Savage | 228—53 |
| 3,032,635 | 5/1962 | Kraft | 219—426 |
| 3,199,740 | 8/1965 | Juffa et al. | 222—146 |
| 3,228,566 | 1/1966 | Knox. | |
| 3,314,573 | 4/1967 | Newton | 120—116 X |

FOREIGN PATENTS 914,405  6/1946  France.

ANTHONY BARTIS, *Primary Examiner.*

U.S. Cl. X.R.

13—6; 18—3.5; 219—421; 222—146; 226—76; 228—53; 401—2